July 20, 1937.   K. M. HAMILTON   2,087,477
CAR TRUCK
Original Filed March 25, 1931   3 Sheets-Sheet 1

INVENTOR
Karl M. Hamilton
BY
Evans + McCoy
ATTORNEYS

July 20, 1937.    K. M. HAMILTON    2,087,477
CAR TRUCK
Original Filed March 25, 1931    3 Sheets-Sheet 2

INVENTOR
Karl M. Hamilton
BY
Evans & McCoy
ATTORNEYS

July 20, 1937. K. M. HAMILTON 2,087,477
CAR TRUCK
Original Filed March 25, 1931 3 Sheets-Sheet 3

INVENTOR
Karl M. Hamilton
BY
Evans & McCoy
ATTORNEYS

Patented July 20, 1937

2,087,477

UNITED STATES PATENT OFFICE 2,087,477

CAR TRUCK

Karl M. Hamilton, Chicago, Ill., assignor to The Bettendorf Company, Bettendorf, Iowa, a corporation of Iowa Original application March 25, 1931, Serial No. 525,051. Divided and this application October 29, 1936, Serial No. 108,244

8 Claims. (Cl. 267—3)

This invention relates to car trucks, and more particularly to the construction and arrangement of the springs and mountings therefor. This application is a division of my copending application Serial No. 525,051, filed March 25, 1931.

One of the objects of the present invention is to overcome many of the objectionable features which occur in conventional car trucks, and to provide a car truck in which coil and elliptic springs may be mounted together and positioned on a common cap or seat.

Another object is to provide a car truck having a combination of coil and elliptic springs.

Another object is to provide a spring cap for use in mounting spring groups which include both helical and elliptic springs.

Another object is to provide a spring cap having formations for engagement with the springs of the car truck to assist in retaining the springs in proper position.

Another object is to provide a device of this character for mounting spring groups which is simple in construction, economical to manufacture and readily applied to a car truck.

With the above and other objects in view, which will be apparent from the following detailed description, the present invention consists in certain features of construction and combinations of parts that will be readily apparent to those skilled in the art to which the invention appertains.

In the drawings which illustrate a suitable embodiment of the present invention, Figure 1 is a side elevation of the improved car truck of the present invention;

Figure 1:
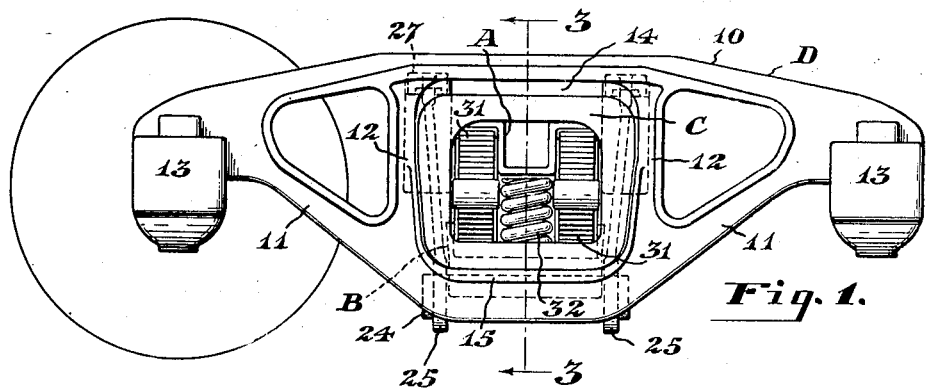

Referring to the accompanying drawings in which like numerals refer to like parts throughout the several views, it will be noted that both sides of the car truck are not shown in complete detail, it being sufficient for the present invention to describe only one side of the car truck, since both sides are of identical construction.

In general, the transversely extending bolster A is supported by means of suitable springs on the spring plank B which in turn is supported from the transom C for movement transversely thereof by means of spaced hanger links hinged to the ends of the transom C, the transom C bridging and being carried by the opposite side frames D of the car truck.

The car truck side frames are each preferably of the cast type, having an integral upper compression cord 10, a lower tension cord 11, and spaced bolster columns 12 extending vertically between the cords 10 and 11. The cords 10 and 11 extend beyond the columns 12 and integrally join each other and terminate in the journal boxes 13.

The cords 10 and 11 and vertical columns 12 are illustrated as being of box or U-section throughout in order to give the greatest strength for a given weight of material. A large central opening 14 is formed in each side frame D, it being defined by the central portion of the compression cord 10, the central horizontal arch bar 15 of the tension cord 11, and the spaced vertical columns 12.

Figure 2:
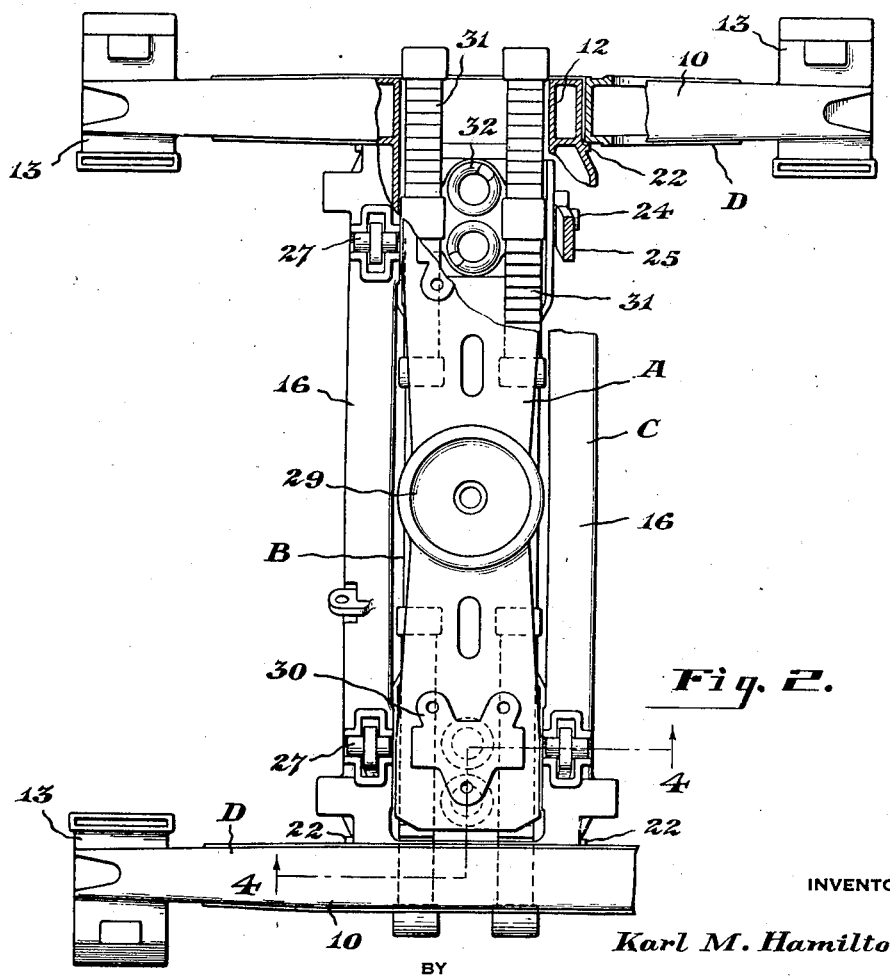
Fig. 2 is a partial plan view of the car truck shown in Fig. 1, a portion of the truck bolster and transom being broken away to show the arrangement of the coil and elliptic springs.
Figure 3:
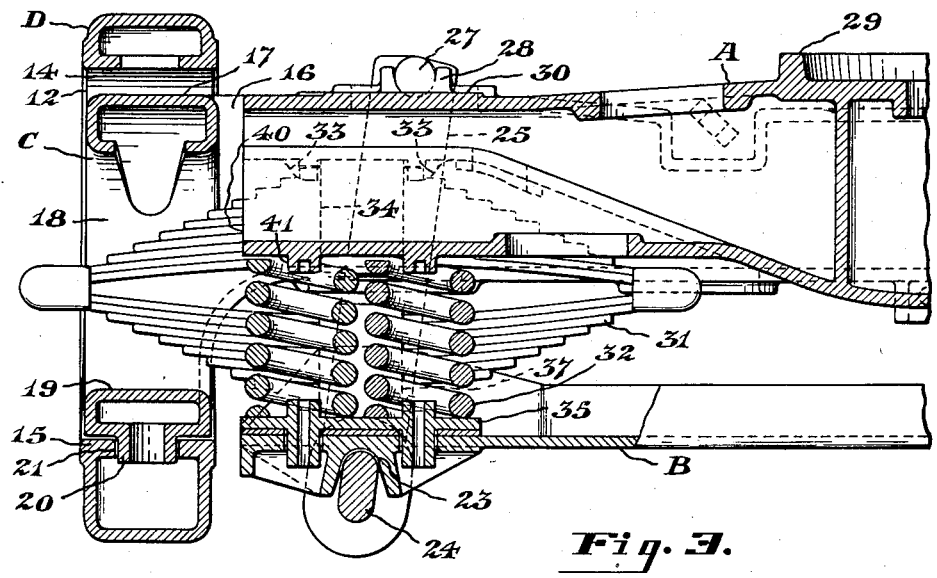
Fig. 3 is an enlarged section taken substantially on the line 3—3 of Fig. 1, showing the method of supporting the truck bolster on the transom which is carried by the truck side frames.
Figure 5:
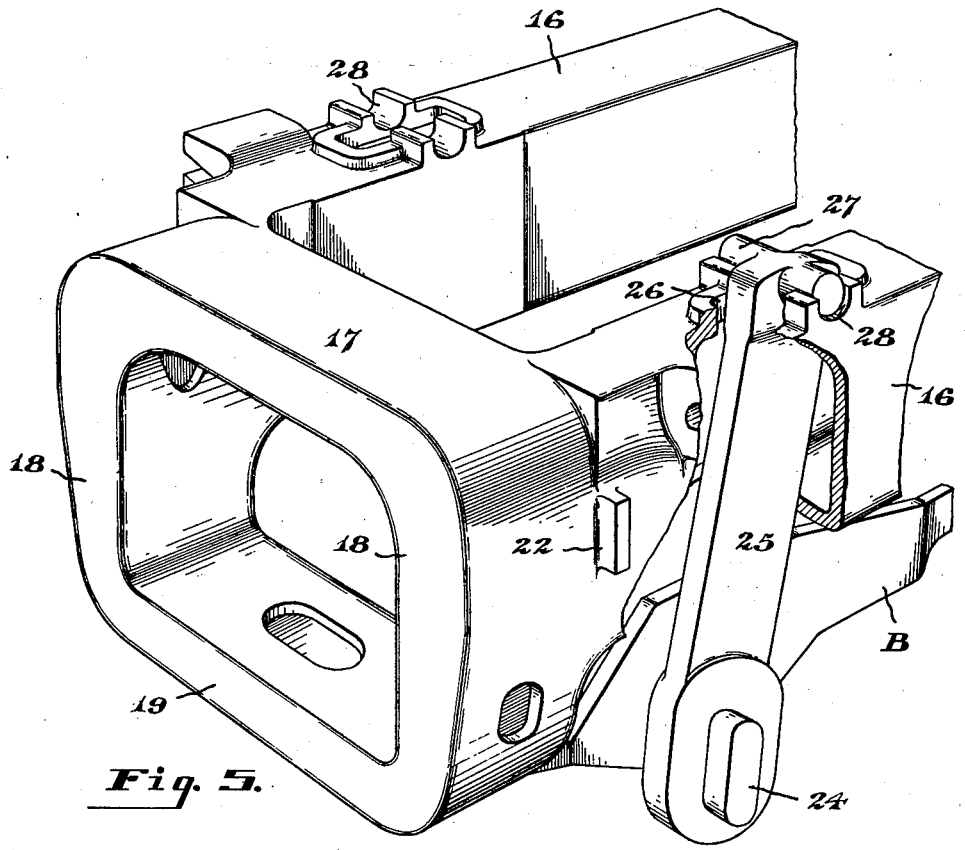
Fig. 5 is a fragmentary enlarged perspective view of the transom showing one of the hanger links which support the spring plank in position.
Figure 6:
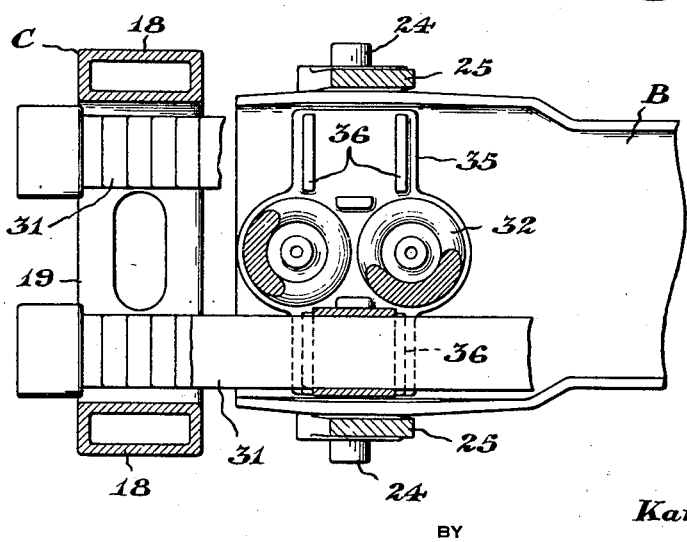
Fig. 6 is a section taken substantially on the line 6—6 of Fig. 4.

The transom C extends between the side frames D, as shown in Figs. 2 and 3, and comprises a pair of spaced horizontal beams 16 arranged parallel to each other. Each beam 16 is preferably hollow and rectangular in cross-section and the beams are connected together at their adjacent ends, as shown in Fig. 5, by rectangular shaped members each having an upper cross piece 17, the walls of which merge into the walls of the beams 16, spaced vertical side portions 18 forming substantial integral continuations of the beams 16, and a lower cross piece 19 extending between the vertical portions 18, below the beams 16. These upper and lower cross pieces and the vertical side portions, like the beams 16, are preferably hollow and of rectangular shape in cross-section.

The transom C is a single casting and, as viewed from top or bottom, or either of its ends, has the appearance of a hollow rectangle.

Figure 4:
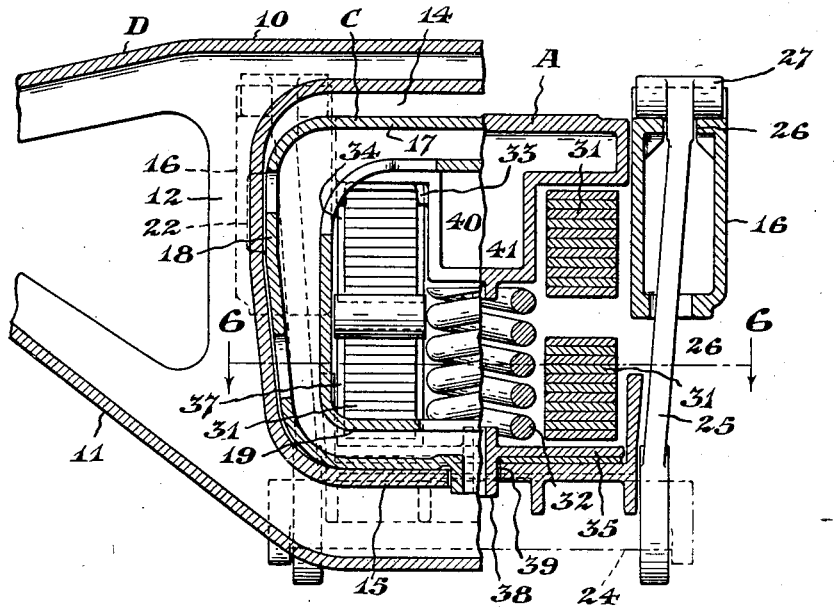
Fig. 4 is an enlarged section taken substantially on the line 4—4 of Fig. 2.

The generally rectangular shaped ends of the transom C formed of the side portions 18 and cross bars 17 and 19 are of slightly less width than, and of materially less depth than the central openings 14 of the side frames, and when the car truck is assembled these generally rectangular shaped ends rest within the central openings 14 of the side frames D with the lower webs of the cross pieces or bars 19 seating on the upper horizontal webs of the lower horizontal arch bars 15 of the side frame tension cords 11, as shown in Figs. 3 and 4.

The transom is anchored on the side frames preferably by means of bosses 20 formed on and depending from the lower webs of the transom cross pieces 19 which register with openings 21 formed in the horizontal portions 15 of the side frame tension cords 11, and by means of projecting lugs 22 formed on the outer vertical webs of the beams 16 of the transom which preferably engage with the inner sides of the side frame columns 12.

The spring plank B may be of any desirable construction and is shown in the drawings as being of inverted channel shape. The ends of the spring plank are formed on their lower sides with spaced inverted U-shaped bearing portions 23, as shown in Fig. 3, which support the spring plank by their pivotal engagement with rectangular shaped pivot bars 24 having rounded edges, one edge of each pivot bar being in engagement with the adjacent bearing portion 23.

Each pivot bar 24 is supported at its ends from depending hanger links 25 which extend downwardly through elongated openings 26 formed in the upper and lower webs of the horizontal beams 16. The upper ends of these hanger links are formed with oppositely extending horizontal pivot shafts 27 which pivotally seat in semi-circular seats 28 formed on the top side of the beams 16 of the transom. In normal position the links 25 at each end of the transom extend downwardly and outwardly at an angle. It is thus seen that the spring plank B is freely suspended below the transom C for movement transversely of the side frames D by means of the pivot bars 25 at the opposite ends of the transom which converge upwardly. This thus provides side motion which greatly increases the ease of riding and eliminates substantial transverse shocks.

The bolster A is of the cast type, but it is obvious that it may be of any desired design. The bolster is provided with the usual center plate 29 and bearing plates 30 for the usual side bearings. The bolster A is supported at its ends on the spring plank B by means of suitable elliptic springs 31 and coil springs 32. Each end of the bolster is supported by two spaced full elliptic springs 31 which extend outwardly through the opening in the generally rectangular open end portion of the transom, and two coil springs 32 interposed between the elliptic springs. These sets of springs are mounted on a suitable spring cap or seat 35 carried at the ends of the spring plank, and in order to maintain the elliptic springs 31 properly aligned with the bolster, the bolster is preferably formed at each end with spaced projections or lugs 33 which straddle the upper spring band 34.

In a similar manner the spring cap or seat 35 is formed with spaced projections or lugs 36, corresponding with the lugs 33, which straddle the lower spring band 37 to align the springs 31 with the spring seat 35. These lugs 33 and 36 maintain the springs 31 in alignment and prevent sidewise tilting in a horizontal plane and longitudinal shifting of the spring with reference to the spring seat.

The spring seat 35 is held against movement on the spring plank B by means of spaced formations or bosses 38 which extend through corresponding openings 39 in the spring plank. The opposite upper side of the spring seat is also formed with upwardly extending bosses which extend within the coil springs 32.

The bolster is formed at each end intermediate its sides with a depending portion 40 which extends between the elliptic springs 31 and forms a seat for the coil springs 32. This depending portion is also formed with small centering bosses 41 which extend within the springs 32, as shown in Fig. 3.

In the present invention, the coil and full elliptic springs 32 and 31, respectively, are so arranged that for full capacity loads both sets of springs will function and therefore provide a variable recovery, thus eliminating sudden shocks. The two sets of springs, being of different capacity, function together in such a manner as to break up rhythmic vertical oscillations.

Thus the present invention provides a spring cap for use in mounting springs of a railway car truck which is arranged to bear against the spring and is provided with formations or projections for engaging the springs to assist in retaining the springs in proper position and alignment with respect to the other parts of the truck. Such a spring cap facilitates the assembling of a car truck and promotes economical construction.

It will be noted that the parts are so constructed as to give the most strength without excessive weight and also arranged so as to permit assembly without the use of bolts, rivets, and the like, the transom being detachably interlocked with the side frames.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A spring cap for a truck spring unit comprising helical and elliptic springs consisting of a plate having a plurality of formations of different kinds projecting from one side thereof, certain of these formations being adapted for centering engagement with the helical springs and the other formations for engagement with the spring band of an elliptic spring.

2. A spring cap for a truck spring unit comprising helical and banded leaf springs consisting of a plate having a plurality of formations projecting from one side thereof, certain of said formations presenting horizontally curved surfaces for positioning engagement with the helical springs and the other formations presenting horizontally straight surfaces for positioning engagement with the band of said leaf springs.

3. A spring assembly comprising upper and lower spring engaging members, helical springs and leaf springs disposed between said members and arranged to operate in parallel under an applied load, said leaf springs being held together by band means, the load surfaces of said springs contacting with the inner surfaces of said members, curved formations provided on said inner surfaces for positioning the helical springs and straight formations provided on said inner surfaces for positioning the band means of said leaf springs.

4. A truck spring assembly comprising load transmitting spring engaging members, a plurality of helical springs and a banded elliptic spring located side by side between said members, the longitudinal axis of said elliptic spring being substantially parallel to a line passing through the centers of said helical springs, and formations provided on the inner surfaces of said members for positioning the helical springs and for engaging a band of said elliptic spring.

5. A spring cap for a truck unit comprising helical and elliptic springs consisting of a plate having a plurality of formations projecting from one side thereof, certain of these formations being adapted for centering engagement with the helical springs and the other formations for engagement with the spring bands of the elliptic springs.

6. A spring cap for a truck spring unit comprising helical and elliptic springs consisting of a plate having knob-like projections for centering engagement with the helical springs and rib-like projections for engaging the spring band of an elliptic spring.

7. A spring cap for a truck spring unit having helical and elliptic springs, comprising a plate having a plurality of formations of different kinds projecting therefrom, certain of these formations adapted for centering engagement with the helical springs, other formations for engagement with the spring band of an elliptic spring, and still other formations for engagement with portions of the truck.

8. A spring cap for a truck spring unit having helical and elliptic springs, comprising a plate having knob-like projections for centering engagement with the helical springs, rib-like projections for engaging with the spring band of an elliptic spring, and formations for engagement with a mating formation in the truck to center the cap on the truck.

KARL M. HAMILTON.